[11] 3,611,184

[72] Inventor William
London,
[21] Appl. No. 805,725
[22] Filed Mar. 10, 1969
[45] Patented Oct. 5, 1971
[73] Assignee The Rank Organization Limited
London, England
[32] Priority Mar. 20, 1968
[33] Great Britain
[31] 13523/68

[54] LASER OPTICAL SYSTEM HAVING DIVERGENT COMPONENT
9 Claims, 3 Drawing Figs.

[52] U.S. Cl. .................................................. 331/94.5, 350/201
[51] Int. Cl. ................................................... H01s 3/08

................................. 331/94.5;
356/106 RL; 350/201

[56] References Cited
UNITED STATES PATENTS
3,182,545 5/1965 Papke .......................... 350/201

*Primary Examiner*—William L. Sikes
*Attorney*—Holcombe, Wetherill & Brisebois

ABSTRACT: A laser optical system has, in place of the normally plane-parallel partly transmitting output reflector element, an element having a concave or convex forward face, and a concave rear face, such that internally reflected light is deflected outwardly away from the axis of the system, thereby avoiding interference with directly transmitted laser output light.

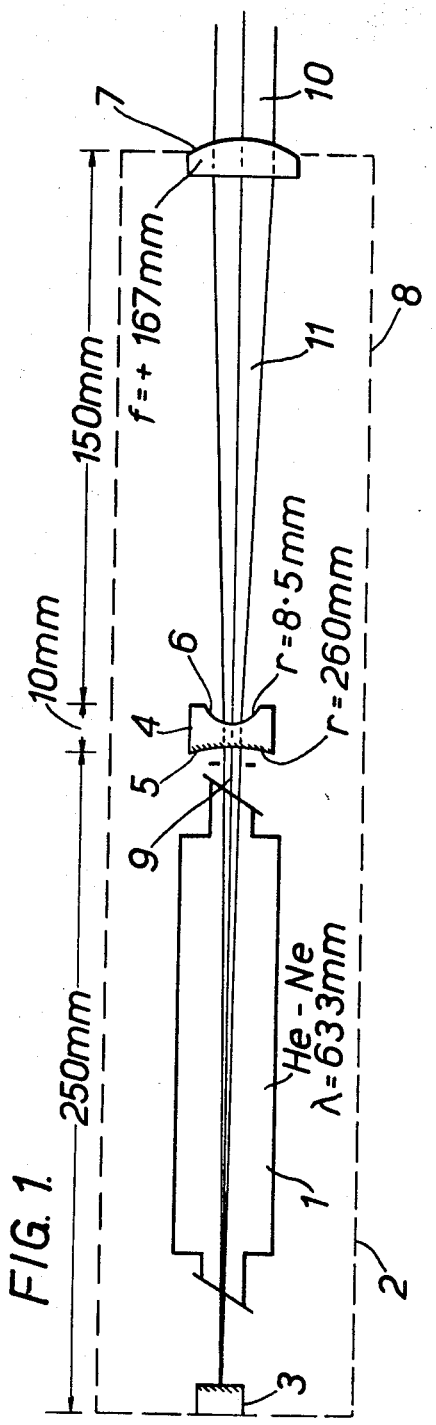
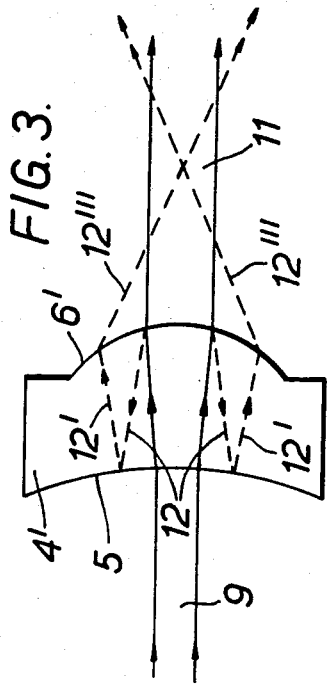
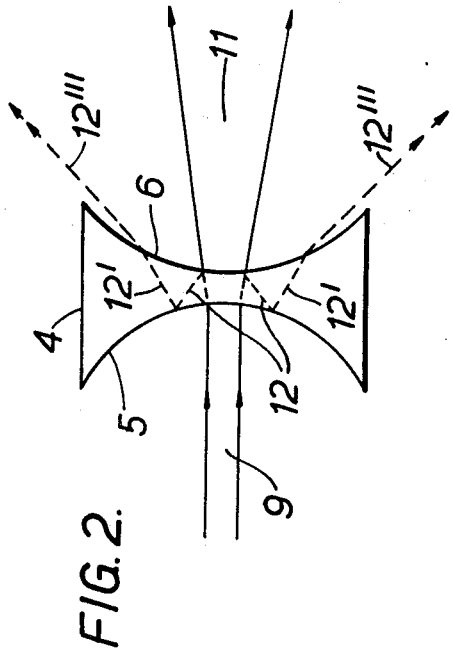

LASER OPTICAL SYSTEM HAVING DIVERGENT COMPONENT

This invention relates to laser assemblies and optical systems for use therewith.

A known laser assembly comprises an optically reflecting cavity enclosing a laser and having at one axial end a semireflecting output reflector arranged to transmit a fraction of the light generated within the laser, for use externally. Some of this light, instead of emerging with the light beam from the external or forward face of the output reflector, is reflected rearwardly within the substance, generally glass, of the output reflector: at least some of the light so reflected is subsequently reflected forwardly from an interface to the rear of the forward face of the output reflector and emerges through the forward face. Such doubly reflected light is no longer coherent with the directly transmitted light, and highly undesirable interference effects result from the phase difference between the directly transmitted and the doubly reflected light.

Furthermore, some of the light reflected rearwardly from the forward face of the output mirror reenters the reflecting cavity as spurious rays and can cause undesirable effects within the cavity. For example, in a frequency-stabilized Helium-Neon laser in which the laser frequency is locked to some part of the neon line, these spurious rays can lead to malfunction of the stabilization system. They can also distort the distribution of light leaving the laser, and cause interference effects similar to those caused by the doubly reflected light.

An object of the invention is to reduce such interference effects in a laser assembly.

The present invention accordingly provides a laser optical system including a partly transmitting output reflector element having a rearward face which is concave towards the direction of incident laser light and a forward face, laser output light, in use of the system, passing directly through the rearward and forward faces in succession, and said forward face having at least a surface portion inclined to the axis of the system so as to deflect outwardly by refraction, away from said axis, light which has been internally reflected in said element. Light rays which are instrumental in causing undesirable interference effects by being doubly reflected in the reflector element are therefore deflected outwardly away from the axis of the system.

In one embodiment the said surface portion of the forward face is outwardly concave, so that internally reflected light upon refraction at said surface portion is caused to diverge away from the axis of the system.

Alternatively, the said surface portion of the forward face may be outwardly convex, so that internally reflected light upon refraction at said surface portion is caused to converge towards, cross over on, and subsequently diverge from the axis of the system.

The invention also includes a laser assembly comprising two reflector elements defining between them an optically reflecting cavity within which a laser is arranged, one of the reflector elements being partly transmitting and constituting an output element, said output element having a rearward and a forward face through which, in use of the system, laser output light transmitted directly through the element passes successively, said rearward face being concave towards the direction of incident laser light, and said forward face having at least a surface portion inclined to the axis of the system so as to deflect outwardly by refraction, away from said axis, light which has been internally reflected in said element.

The convex or concave surface portion of the forward face of the output reflector element may comprise at least a central part of the said forward face, shaped as part of the surface of a sphere. Alternatively, the curvature of the said surface portion could, for example, be paraboloidal, or cylindrical.

According to a feature of the invention the laser output reflector element is arranged to form one element of an optical system adapted to effect an increase in the cross section area of the laser beam and to project a beam of the increased cross-sectional area but of small divergence. Thus in one embodiment the said output reflector element constitutes part of a reversed Galilean telescope.

Advantageously at least the forward face of the output reflector element has an antireflection coating.

The invention will now be described, by way of example, with reference to the accompanying diagrammatic drawings, in which:

FIG. 1 is a diagrammatic side view of a laser assembly according to one embodiment of the invention.

FIG. 2 is a sectional side view of an output reflector element employed in the optical system of the laser assembly of FIG. 1, illustrating the path of the laser light beam and the paths of some of the internally reflected rays in the said element.

FIG. 3 is a sectional side view of an alternative output reflector element.

In FIG. 1 an He-Ne gas laser 1 of which the emission wavelength is 633 mm. is disposed within an optically reflecting resonator cavity 2 having a rear plane reflector element 3 and a front or output partly transmitting reflector element 4. The rear face 5 of the output element 3 is provided with a semireflecting mirror surface of part spherical form curved to a radius of 260 mm., the separation of the elements 3 and 4 being of the same order as this radius (250 mm.).

The body of the output reflector element 4 is made of Spectrosil "B" (Trademark) and has a thickness of 10 mm. The forward face 6 of the element 4, instead of being plane, is concavely curved over a central surface portion to define a depression of part spherical form having a radius of curvature (8.5 mm.) of the same order as the thickness of the element 4. At least the forward face 6 of the element 4 has an antireflection coating applied thereto.

The biconcave lens constituted by the output reflector element 4 is used in conjunction with a planoconvex lens 7 to control the laser output beam by converting the small diameter beam 9 of the laser to a beam 10 of relatively large diameter constituted by parallel rays projected from the lens 7.

The lens 7 is positioned, by suitable supporting means 8 (broken lines), coaxially with the output element 4 and at a distance of 150 mm. from said element 4. The focal length of the lens 7 is 167 mm. (refractive index $n=1.45$ min.).

FIG. 2 indicates in full lines the divergent beam 11 of wanted coherent laser output light transmitted through the output element 4 towards the lens 7. At 12''' are indicated in dotted lines some of the rays of internally reflected and unwanted radiation, those shown representing rays at the outside of a beam of unwanted rays. As shown, the rays 12''' originate in rays 12 reflected rearwardly from the forward face 6 of the element 4. The reflected rays 12 are directed both rearwardly and outwardly away from the axis of the incident laser beam 9, the outward component, due to the curvature of the central portion of the face 6, being somewhat greater than if the face were flat. At the rear face 5 of the output element 4, these unwanted rays 12 are reflected forwardly and outwardly as rays 12'. At the curved surface of the face 6 the rays 12' meet that surface at such an angle that the rays are deflected by refraction outwardly at an increased angle away from the beam 9 of wanted radiation. In this manner the amplitude of unwanted radiation inside the cone of wanted radiation is reduced so that interference between the wanted (transmitted) beam and the internally reflected rays is reduced.

With the assembly shown in FIG. 1, 63.2 percent of the laser output was obtained in a beam of 7 mm. diameter and the diameter of the beam was substantially constant over a distance of over 100 meters.

The invention has been specifically described in its application to apparatus for producing a laser beam of small divergence but of substantial diameter. It will, however, be appreciated that the invention is in general applicable to other forms of apparatus in connection with which the "cleaning" of a laser output is desired.

More particularly, the invention is useful when it is desired to alter the divergence of a laser beam and the attendant interference is troublesome. For example, the invention may be applied to apparatus in which a laser beam is caused to diverge for the purpose of illuminating holograms.

FIG. 3 illustrates an alternative form of partly transmitting output reflector element 4' having, instead of the concave forward face 6 of FIG. 2, a convex forward face 6', so that internally reflected light rays, extreme ones of which are indicated at 12''', converge towards, cross over on, and subsequently diverge from the axis of the system.

What is claimed is:

1. A laser optical system including a partly transmitting output reflector element having a rearward face and a forward face through which, in use of the system, laser output light transmitted directly through the element passes successively, said rearward face being concave towards the direction of incident laser light and said forward face having a radius of curvature of the same order as the thickness of the element so as to deflect by refraction, away from the optical axis of the system, light which has been internally reflected within said element.

2. The laser optical system of claim 1, wherein said forward face is outwardly concave, and internally reflected light upon refraction at said surface portion is caused to diverge away from said axis of said system.

3. The laser optical system of claim 2, wherein said partly transmitting output reflector element is effective to produce a slight divergence of laser output light transmitted directly therethrough and including a light-transmitting converging lens element disposed in front of and spaced from said output reflector element to cause said light transmitted therethrough to emerge in a substantially parallel beam of substantially greater cross section than said beam incident on said output reflector element.

4. The laser optical system of claim 1, wherein said forward face is outwardly convex, and internally reflected light upon refraction at said surface portion is caused to converge towards, cross over on, and subsequently diverge from said axis of said system.

5. The laser optical system of claim 1 wherein the radius of curvature of said rearward face is considerably greater than that of said forward face.

6. The laser optical system of claim 5 wherein said radius of curvature of said rearward face is of the same order as the distance between the two reflector elements.

7. The laser optical system of claim 1 further including a reflector element aligned with and spaced from said output reflector element and defining therewith an optically reflecting laser-accommodating cavity.

8. The laser optical system of claim 1 wherein at least said forward face of said output reflector element has an antireflection coating.

9. A laser optical system including a partly transmitting output reflector element having a rearward face and a forward face through which, in use of the system, laser output light transmitted directly through said element passes successively, said rearward face being concave toward the direction of incident laser light and having a long radius of curvature with respect to the thickness of said element, and said forward face having a radius of curvature of the same order as the thickness of said element so as to deflect by refraction, away from the optical axis of the system, light which has been internally reflected within said element.